(No Model.)
G. W. UNDERWOOD.
Farm Elevator.
No. 238,184. Patented Feb. 22, 1881.
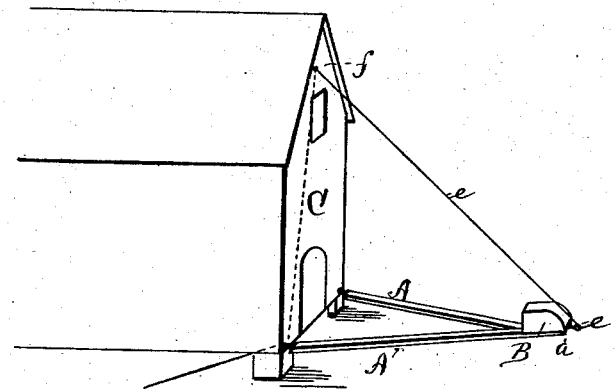
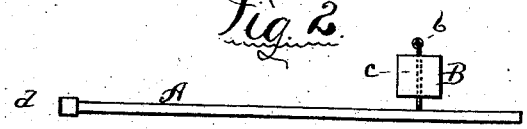
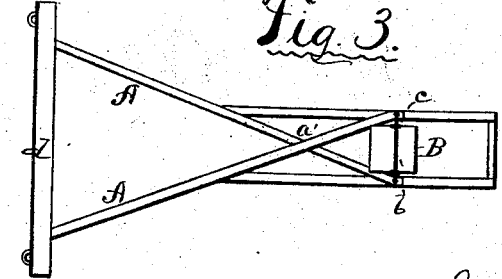
Witnesses:
J. H. Parsons
J. R. Drake
Geo. W. Underwood
Inventor, by
J. R. Drake,
Atty.

UNITED STATES PATENT OFFICE.

GEORGE W. UNDERWOOD, OF HILLSDALE, MICHIGAN.

FARM-ELEVATOR.

SPECIFICATION forming part of Letters Patent No. 238,184, dated February 22, 1881.

Application filed November 29, 1880. (No model.)

*To all whom it may concern:*

Be it known that I, GEORGE W. UNDERWOOD, a citizen of the United States, residing at Hillsdale, in the county of Hillsdale and State of Michigan, have invented a new and useful Improvement in Farm-Elevators, of which the following is a specification.

My invention relates to a device for farmers' use, more particularly, to raise grain, &c., from the ground or a wagon into an upper door or window of a store-house or other place, to be operated by a single horse; and the invention consists in a frame made of two pieces of wood that meet or cross each other near the top in triangular shape, the legs spreading out sufficiently to give necessary width at the bottom, and are hooked or otherwise loosely attached to the side or base of a house, barn, &c., so as to allow the elevator to swing up and down therefrom, or a rounded base-piece may be attached to the bottom of the two legs and then either set on the ground against the house or on a platform, or hooked, to eyes or staples, to the side of the house or barn, to swing up and down thereby. The frame is suitably braced at or near the upper part, and made either square or pointed, and has a rope or chain attached which runs through a pulley attached to the house, by which the elevator is drawn up, carrying a swinging box loaded either with loose grain or in bags, and delivers itself into the open door or window of the store-house. By loosening the rope the elevator falls, by its own weight, gradually.

The object of this invention is to get a cheap device for inland farmers, to save carrying sacks, &c., of grain, &c., up stairs on men's backs, or wheeling it up inclines, and thus save greatly in time, expense, &c., as hereinafter fully explained.

In the drawings, Figure 1 is a perspective, showing the end of a barn and the elevating device attached thereto, resting on the ground ready to be operated; Fig. 2, a side elevation of the device showing the self-delivering box attached to the frame, so as to always swing perpendicularly; Fig. 3, a top plan of the elevator, having a base-piece attached.

In the drawings, A A represent the main pieces or legs, that either unite at the top at $a$, as in Fig. 1, or else cross each other, as $a'$, Fig. 3. This variation is necessary to give greater strength for heavier work, making a square bracing at the top, substantially as shown.

At the top of the triangle $a$ or $a'$ is swung a carrier of any suitable shape, the more simple form shown in Fig. 1. In Figs. 2 and 3 it is a box, B, set by bails $b$ onto metal arms $c$, so as to swing clear and keep the mouth of the box B always upright, so that it can be filled while the elevator lies on the ground, as in Fig. 3, and keep perpendicular during its upward movement. The first shape will throw out its contents as soon as the top of the elevator reaches the building.

The two legs A A are either hooked directly to the store-house C at the bottom, as in Fig. 1, or they may be attached to a base-piece, $d$, as in Fig. 3, which will merely set on the ground against the house, or is hooked thereto, if necessary.

To the top of the elevator is fastened a chain or rope, $e$, that will run through a pulley or eye, $f$, attached to the house, the other end of the rope attached to the harness and operated by a single horse, usually, by which the whole is raised. It is lowered by its own weight and the backing of the horse.

The need of a cheap and handy device like this has been long felt, to do away with the fatigue of men carrying single bags. Nothing could be simpler or more effective than my device.

With a single horse one thousand bushels of wheat or one thousand five hundred bushels of oats can be elevated into a store-house in one hour, or one hundred and sixty bushels in ten minutes.

On large or small farms it is difficult to obtain hands or power to handle the grain after being thrashed; but with my device, one horse attached to a whiffletree and rope, with a boy to drive, can do all the work of elevating the grain, &c., into a store-house or onto cars, &c., and at only a trivial expense, making the work mere pastime.

For inland stations of railroads that are not terminal this device would also prove of great advantage.

I claim—

The triangular frame-work with spreading legs A A, and with or without the base-piece $d$, the box or receptacle B, at or near the top $a$ or $a'$, the rope $e$, and pulley $f$, all arranged to operate in connection with the side or end of a barn, store-house, or other delivering place, substantially as and for the purpose specified.

In witness whereof I have hereunto signed my name in the presence of two subscribing witnesses.

GEO. W. UNDERWOOD.

Witnesses:
J. R. DRAKE,
H. A. BENTLIF.